United States Patent [19]

Hubbard

[11] 4,030,162
[45] June 21, 1977

[54] FOOD PROCESSING APPARATUS

[76] Inventor: James L. Hubbard, Rte. 1, Box 119,, Wewoka, Okla. 74884

[22] Filed: Apr. 7, 1976

[21] Appl. No.: 674,404

[52] U.S. Cl. .................................... 17/1 R; 17/17; 83/100

[51] Int. Cl.² ....................................... A22C 17/00

[58] Field of Search ................. 17/1 R, 16, 17, 18, 17/19, 21; 83/100, 52

[56] References Cited

UNITED STATES PATENTS

| | | |
|---|---|---|
| 3,237,664 | 3/1966 | Macy et al. ............................ 17/52 |
| 3,685,095 | 8/1972 | Metro ................................. 17/1 R |
| 3,714,681 | 2/1973 | Van Snellenberg ................. 17/1 R |
| 3,811,152 | 5/1974 | Hervbel ............................. 17/1 R |

Primary Examiner—J. N. Eskovitz
Assistant Examiner—Paul J. Hirsch
Attorney, Agent, or Firm—Dunlap, Codding & McCarthy

[57] ABSTRACT

A food processing apparatus for removing leaf fat from the abdominal cavity of a hog carcass wherein a first plate and a second plate are positionable with respect to the hog carcass, the first and second plates being engageable with a portion of the exposed surface of the leaf fat in a removal position of the first and second plates with respect to the leaf fat to be removed. A handle assembly connected to the first and second plates is utilized to position the first and second plates into and from the removal position via maneuvering the handle assembly. A first hook is connected to the first plate and a second hook is connected to the second plate for severingly engaging a portion of the leaf fat when positioning the first and second plates in the removal position for severing a portion of the leaf fat from the hog carcass to facilitate the removal of the leaf fat. An engagement is maintained between the leaf fat and the first and second plates while moving the first and second plates relative to the hog carcass for removing a portion of the leaf fat from the hog carcass.

16 Claims, 5 Drawing Figures

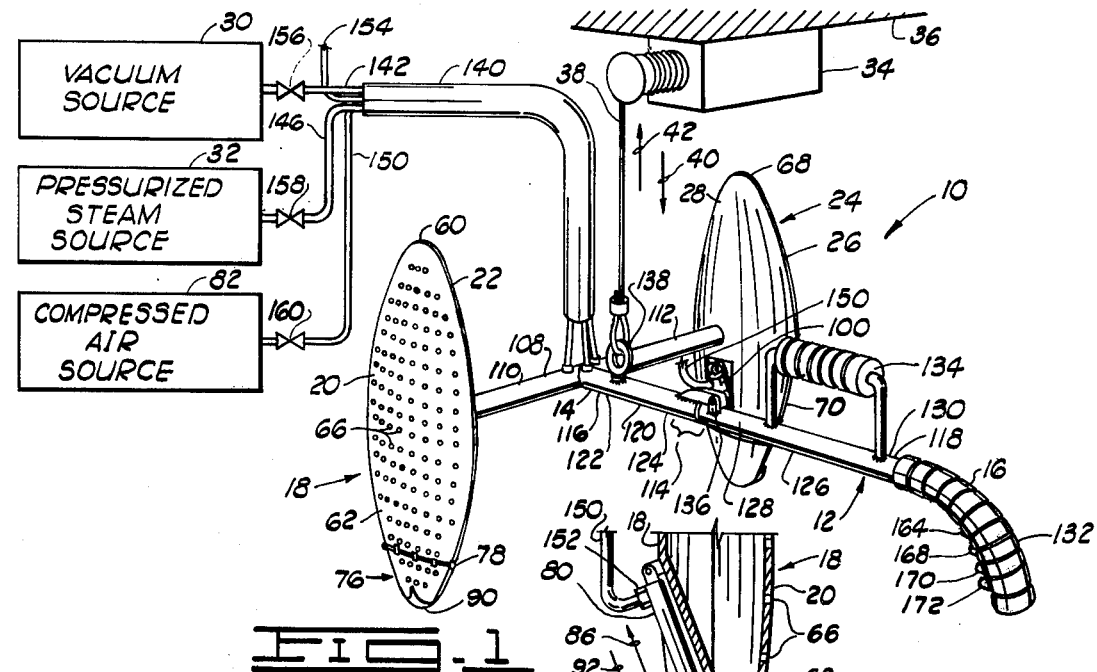
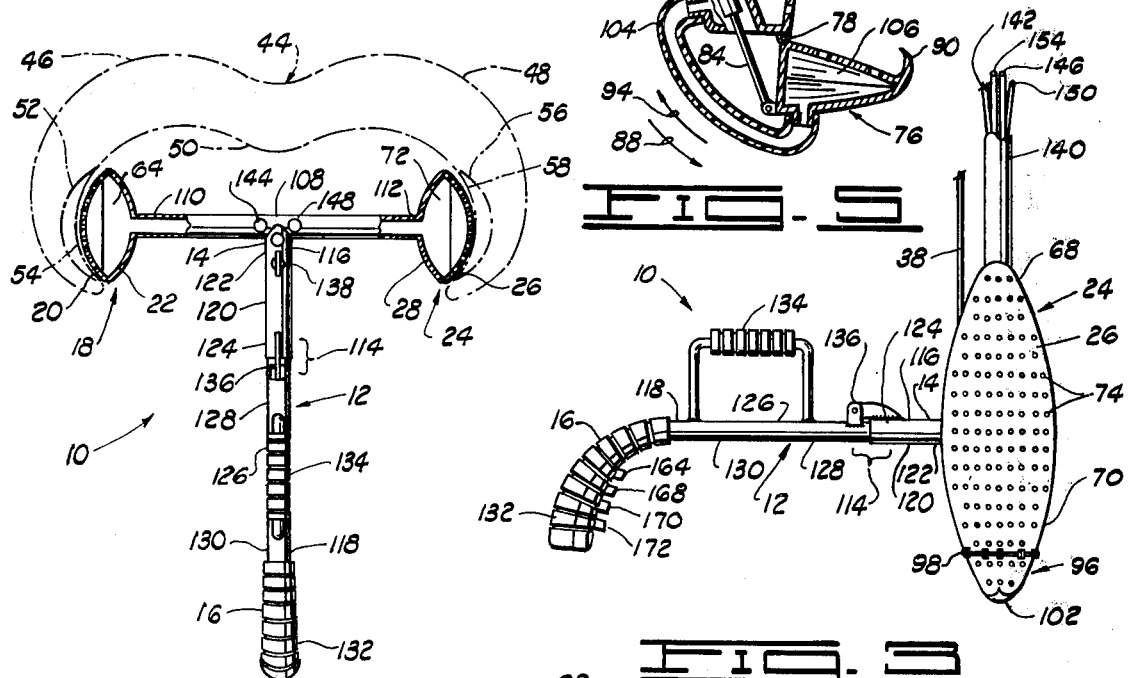
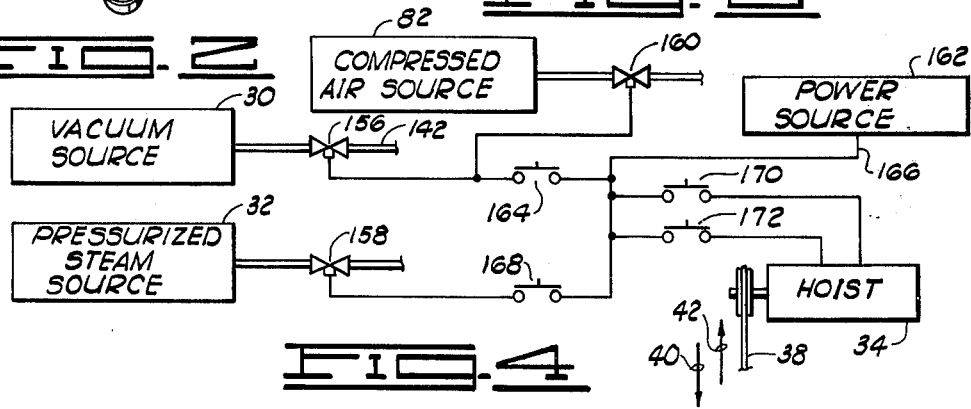

FOOD PROCESSING APPARATUS

BACKGROUND OF THE INVENTION

1. Field of the Invention

The present invention relates generally to food processing apparatus and, more particularly, but not by way of limitation, to a food processing apparatus for removing leaf fat from the abdominal cavity of a hog carcass.

2. Description of the Prior Art

In the past, various devices have been constructed for removing various parts from various types of animal carcasses and the like.

The U.S. Pat. No. 3,714,681, issued to Van Snellenberg disclosed a device for cutting glands from membranes of fish. The gland was pulled away from the membrane by a suctionhead and a rotating cutter sleeve rotating about the sectionhead was automatically moved into position for cutting the membrane from the gland. The U.S. Pat. No 1,997,843, issued to Warrell, disclosed a device for producing openings in multi-ply flexible materials wherein a tubular cutter was automatically moved into rotating engagement with the material. The British Pat. No. 833,422, issued to Burgess disclosed a device for boring encysted areas from fillets of fish.

Various other devices for processing animal carcasses and the like were disclosed in the U.S. Pat. Nos. 3,849,836, issued to Bernard; U.S. Pat. No. 3,820,196, issued to Penman; U.S. Pat. No. 3,685,095, issued to Metro; U.S. Pat. No. 3,533,131, issued to Ivarsson; U.S. Pat. No. 3,234,591, issued to Vogt et al.; U.S. Pat. No. 3,177,520, issued to Vogt et al.; U.S. Pat. No. 3,156,945, issued to Vogt et al.; U.S. Pat. No. 3,129,456, issued to Renfroe; U.S. Pat. No. 692,824, issued to Burleson; and German Pat. No. 237,892.

BRIEF DESCRIPTION OF THE DRAWINGS

FIG. 1 is a partial perspective, partial schematic, partial diagrammatic view showing the food processing apparatus of the present invention.

FIG. 2 is a partial sectional, top elevational view of the first and second plates and the handle assembly of the food processing apparatus of FIG. 1 with the first and second plates engaging a portion of the leaf fat of a hog carcass (shown in dashed-lines).

FIG. 3 is a side elevational view showing the second plate and the handle assembly of the food processing apparatus of FIGS. 1 and 2.

FIG. 4 is a schematic drawing showing the switches (disposed in the handle assembly) electrically connected to the respective valves of the vacuum source, the compressed air source, and the pressurized steam source and to the hoist.

FIG. 5 is a partial sectional, side elevational view showing the hook in a severingly engaging position.

DESCRIPTION OF THE PREFERRED EMBODIMENT

Referring to the drawings in general, and to FIG. 1 in particular, shown therein and designated by the general reference numeral 10 is a food processing apparatus constructed in accordance with the present invention. The food processing apparatus 10 is used to remove food portions from carcasses of animals wherein the carcasses have been processed to the extent of removing the internal parts thereby forming a cavity within the carcasses prior to the use of the apparatus 10. The carcasses are generally supported by or hanging from an overhead moving chain or the like (not shown) for delivering the carcasses to the various stations where each phase of the processing is performed.

The food processing apparatus 10 is particularly suitable in the processing of hog carcasses wherein it is desirable to remove the leaf fat from each side of the abdominal cavity of the hog carcasses. The leaf fat is formed on each rib section within the abdominal cavity as is well known in the art and in the past such leaf fat has been removed primarily by a hand type operation. More particularly, in the past, a lower portion of the leaf fat was gripped by hand and physically torn from the rib section to initiate the removal of the leaf fat and, with a continuously upwardly applied force, the leaf fat was stripped from the rib section to complete the removal process. The leaf fat removal process was performed on the leaf fat of both rib sections while the hog carcass was being moved via the overhead moving chain or conveyor (not shown).

Utilizing the present invention, the hog carcass is delivered to a leaf fat removal station via an overhead chain, as described above, or by any other method used in the art for delivering the hog carcasses to a particular work station for removing the leaf fat. The food processing apparatus 10 can be incorporated into a portable apparatus and moved to any desired location for removing the leaf fat, in a manner which will be apparent to those skilled in the art from detailed description of the invention contained herein. In any event, for purposes of description, the hog carcasses will be assumed to be hung from an overhead moving conveyor for delivering the hog carcasses to a leaf fat removal station.

The food processing apparatus 10 is constructed to assist the operator in removing the leaf fat from the hog carcass in a relatively fast, convenient and efficient manner. A portion of the food processing apparatus 10 is grippingly engageable by an operator for maneuvering the food processing apparatus 10 to a position wherein a portion engages a portion of the leaf fat to be removed. During the engaging of the portion of the food processing apparatus 10 with the leaf fat to be removed, a portion of the leaf fat is severed from the hog carcass to facilitate the removal of the leaf fat and a portion of the food processing apparatus 10 is maintained in engagement with a portion of the leaf fat to be removed as the leaf fat is removed from the hog carcass.

Referring to FIG. 1, the food processing apparatus 10 generally includes a handle assembly 12, having a first end 14 and a second end 16; a first plate 18, having a first face 20 and a second face 22, the first plate 18 being connected to a portion of the handle assembly 12 near the first end 14; and a second plate 24 having a first face 26 and a second face 28, the second plate 24 being connected to a portion of the handle assembly 12 near the first end 14. The first face 20 of the first plate 18 is shaped for engaging a portion of the exposed surface of the leaf fat to be removed in the removal position of the first plate 18 with respect to the leaf fat and the first face 26 of the second plate 24 is shaped for engaging another portion of the exposed surface of the leaf fat to be removed in a removal position of the second plate 24 with respect to the leaf fat. The handle assembly 12, more particularly, is grippingly engageable via an operator and is utilized in one aspect of leaf fat removal operation to maneuver the first and second plates 18 and 24 into the removal position with respect to the leaf fat to be removed.

The food processing apparatus 10 further includes a vacuum source 30 connected to the first and second plates 18 and 24 for cooperating to maintain an engagement between the first and second plates 18 and 24 and the leaf fat to be removed in the removal position of the first and second plates 18 and 24; a pressurized steam source 23 connected to the first and second plates 18 and 28 for cooperating to release the leaf fat after removal thereof from engagement with the first and second plates 18 and 24 after the removal of the leaf fat; a hoist 34 connected to a support structure 36 having a cable releasing position and a cable retrieving position; and hoist cable 38, having one end connected to the hoist 34 and the opposite end connected to one of the first and second plates 18 and 24 or, more particularly, to the handle assembly 12, a portion of the hoist cable 38 being released from the hoist 34 in the cable releasing position of the hoist 34 for moving the first and second plates 18 and 24 in a first direction 40 relative to the hog carcass and a portion of the hoist cable 38 being retrieved via the hoist 34 in the cable retrieving position of the hoist 34 for moving the first and second plates 18 and 24 in a second direction 42 relative to the hog carcass. It should be noted that the handle assembly 12 is moved in the first and second directions 40 and 42 along with the first and second plates 18 and 24; but, for clarity of description, only the first and second plates 18 and 24 will be described herein as moving relative to the hog carcass.

A hog carcass designated by the general reference numeral 44 is shown in FIG. 2 hanging with a generally vertical disposition from the overhead conveyor (not shown). The hog carcass 44 has a first side 46, a second side 48, and an abdominal cavity 50 formed by a prior phase of the processing of the hog carcass 44, the hog carcass 44 subsequently being delivered to the leaf fat removing station via the conveyor. The leaf fat of the hog is formed within the abdominal cavity 50 on each first and second side 46 and 48. The leaf fat formed on the first side 46 is designated by the reference numeral 52 and has upper and lower ends (not shown) and an exposed surface 54 within the abdominal cavity 50. The leaf fat formed on the second side 48 designated by the reference 56 and has upper and lower ends, and an exposed surface 58 within the abdominal cavity 50.

The support structure 36 supports the hoist 34 generally above the hog carcass 44 and, in one aspect, the support structure 36 may be a portable unit containing the food processing apparatus 10 for moving the food processing apparatus 10 to the hog carcass 44 for removing the leaf fat. In one embodiment, the support structure 36, more particularly, is formed by a portion of a roof structure or the like.

The first and second plates 18 and 24, in one phase of the leaf fat removal process, are each positioned vertically with respect to the hog carcass 44 via the operation of the hoist 34 wherein the hoist 34 is activated either in the cable releasing position or the cable retrieving position to effect the vertical positioning of the first and second plates 18 and 24. In the cable releasing position of the hoist 34, a portion of the hoist cable 38, as mentioned, is released from the hoist 34 for moving the first and second plates 18 and 24 in the first direction 40 to a desired vertical position with respect to the hog carcass 44. In the cable retrieving position of the hoist 34, a portion of the hoist cable 38 is retrieved via the hoist 34 for moving the first and second plates 18 and 24 in the second direction 42 to a desired vertical position with respect to the hog carcass 44.

The first and second plates 18 and 24 are thus positionable via the hoist 34 in various vertical positions and, more particularly, the first and second plates 18 and 24 are vertically positionable for engaging the first face 20 of the first plate 18 with one of the exposed leaf fat surfaces 54 and 58 and for engaging the first face 26 of the second plate 24 with the other of the exposed leaf fat surfaces 54 and 58. The first and the second plates 18 and 24 are positionable relative to the hog carcass 44 for removing the leaf fat 52 and 56 therefrom.

The first face 20 of the first plate 18 is shaped to generally conform to a portion of one of the exposed leaf fat surfaces 54 and 58. The first plate 18 in one plane [i.e. a frontal view of the first plate 18 viewing the first face 20] has a generally elliptical shape [as shown in FIG. 1] in another generally perpendicular plane the first face 20 of the first plate 18 has a curved surface [shown in FIG. 2] to generally conform to one of the exposed leaf fat surfaces 54 and 58 for positioning the first plate 18 in the removal position. Similarly, the first face 26 of the second plate 24 is shaped to generally conform to a portion of the other of the exposed leaf fat surfaces 54 and 58. The second plate 24 in one plane [i.e., a frontal view of the second plate 24 viewing the first face 26, shown in FIG. 1] has a generally elliptical shape and in another perpendicular plane the first face 26 of the second plate 24 has a curved surface [shown in FIG. 2] to generally conform to one of the exposed leaf fat surfaces 54 and 58 for positioning the second plate 24 in the removal position.

The first plate 18 further includes upper and lower ends 60 and 62, a cavity 64 formed in a portion thereof and a plurality of openings 66 formed through the first face 20 of the first plate 18 intersecting the cavity 64. The vacuum source 30 and the pressurized steam source 32 are each connectable to the cavity 64 of the first plate 18 for communication therewith. In a connected position of the vacuum source 30 with the cavity 64, the vacuum source 30 is utilized to create a suction within the cavity 64 of the first plate 18. The suction within the cavity 64 of the first plate 18 created by the vacuum source 30 forms a suction at the intersection of the openings 66 and the first face 20 of the first plate 18 (only some of the openings 66 being designated via reference numerals in the drawings). In the removal position of the first plate 18, a portion of one of the exposed leaf fat surfaces 54 or 58 is pulled toward the first face 20 of the first plate 18 for maintaining an engagement therebetween as the leaf fat 52 or 56 is removed from the hog carcass 44. In a connected position of the pressurized steam source 32 with the cavity 64 of the first plate 18, the pressurized steam source 32 is utilized to produce a flow of steam through the cavity 64 of the first plate 18 exiting through the openings 66. The flow of steam produced by the pressurized steam source 32 within the cavity 64 of the first plate 18 cooperates to release the leaf fat 52 or 56 from engagement with the first face 20 of the first plate 18, the pressurized steam source 32 also operating to clean a substantial portion of leaf fat or other foreign matter from the openings 66.

The second plate 24 further includes upper and lower ends 68 and 70, a cavity 72 formed in a portion thereof and a plurality of openings 74 formed through the first face 26 of the second plate 24 intersecting the cavity 72. The vacuum source 30 and the pressurized steam source 32 are each connectable to the cavity 72 of the second plate 24 for communication therewith. In a connected position of the vacuum source 30 with the cavity 72, the vacuum source 30 is utilized to create a suction within the cavity 72 of the second plate 24. The suction within the cavity 72 of the second plate 24 created by the vacuum source 30 forms a suction at the intersection of the openings 74 and the first face 26 of the second plate 24 (only some of the openings 74 being designated via reference numerals in the drawings). In the removal position of the second plate 24, a portion of one of the exposed leaf fat surfaces 54 or 58 is pulled toward the first face 26 of the second plate 24 for maintaining an engagement therebetween as the leaf fat 52 or 56 is removed from the hog carcass 44. In a connected position of the pressurized steam source 32 with the cavity 72 of the second plate 24, the pressurized steam source 32 is utilized to produce a flow of steam through the cavity 72 of the second plate 24 exiting through the openings 74. The flow of steam produced by the pressurized steam source 32 within the cavity 72 of the second plate 24 cooperates to release the leaf fat 52 or 56 from engagement with the first face 26 of the second plate 24, the pressurized steam source 32 also operating to clean a substantial portion of leaf fat or other foreign matter from the openings 74.

As can be seen most clearly in FIG. 5, a first hook 76 is pivotally connected to the lower end 62 of the first plate 18 via a first pivot pin 78. A first hydraulic ram 80 is connected between the first plate 18 and the first hook 76 and is actuatable via a compressed air source 82 to move a first ram portion 84 thereof in a first ram direction 86 to pivot the first hook 76 in a first pivotal direction 88 to severingly engage a first knife edge portion 90 of the first hook 76 with the leaf fat 52 to be removed during the positioning of the first plate 18 in the removal position. The first hydraulic ram 80 is provided with a return spring (not shown) which moves the first ram portion 84 in a second ram direction 92 when the first hydraulic ram 80 is actuated to pivot the first hook 76 in a second pivotal direction 94 substantially opposite to the first pivotal direction 88 to disengage the first knife edge portion 90 of the first hook 76 from the leaf fat 52 after the removal of the leaf fat 52 from the hog carcass 44.

A second hook 96, constructed substantially the same as the first hook 76, is pivotally connected to the second plate 24 via a second pivot pin 98. A second hydraulic ram 100 is connected between the second plate 24 and the second hook 96 so as to be actuatable in substantially the same manner as the first hydraulic ram 80 to pivot the second hook 96 relative to the second plate 24 to severingly engage a second knife edge portion 102 of the second hook 96 with the leaf fat 56 in the removal position of the second plate 24.

A first hook hose 104 and a second hook hose (not shown) is connected between the first plate 18 and the first hook 76 and between the second plate 24 and the second hook 96, respectively. The first hook hose 104 establishes communication between the cavity 64 of the first plate 18 and a cavity 106 of the first hook 76. The second hook hose (not shown) similarly established communication between the cavity 72 of the second plate 24 and a cavity (not shown) of the second hook 96.

The handle assembly 12 generally includes a hollow support shaft 108 having opposite ends 110 and 112; and a control shaft 114, having opposite ends 116 and 118, connected to a medial portion of the handle assembly 12 and extending substantially perpendicularly therefrom.

The support shaft 108 is connected to the first plate 18 via the end 110 and is connected to the second plate 24 via the end 112. The first and second plates 18 and 24 are spaced apart via the support shaft 108 a sufficient distance such that the first face 20 of the first plate 18 is engageable with the exposed leaf fat surface 54 in the removal position of the first plate 18 when the first face 26 of the first plate 24 is engaged with the exposed leaf fat surface 58. Furthermore, the support shaft 108 provides communication between the cavity 64 of the first plate 18 and the cavity 72 of the second plate 24.

The control shaft 114 is comprised of a first rod 120, having opposite ends 122 and 124, and a second rod 126, having opposite ends 128 and 130. The second rod 126 has a first curved hand grip 132 formed at the end 130 and a second hand grip 134 connected to a medial portion of the second rod 126. The hand grips 132 and 134 are grippingly engageable via an operator for maneuvering the first and second plates 18 and 24 into and from the removal position.

A pivotal attachment 136 connects the first end 128 of the second rod 126 to the second end 124 of the first rod 120, the second rod 126 (having a smaller diameter than the first rod 120) being partially inserted into the first rod 120. This allows the operator a limited degree of vertical movement while maneuvering the first and second plates 18 and 24 into and from the removal position.

An eyelet type fastening ring 138 is connected to the handle assembly 12 and, more particularly, to the first rod 120, generally near the end 122 of the first rod 120, for connecting the hoist cable 38 to the handle assembly 12. The hoist 34, as described before, is supported generally above the hog carcass 44 via the support structure 36 and cooperates to support the first and second plates 18 and 24 [and the handle assembly 12] generally in a suspended position via the hoist cable 38. The first and second plates 18 and 24 in the suspended position are maneuveringly positionable into and from the removal position via the operator maneuvering the handle assembly 12 wherein the first and second plates 18 and 24 are positioned vertically with respect to the hog carcass 44 via the operation of the hoist 34.

As mentioned before, the vacuum source 30 and the pressurized steam source 32 are each connectable to the cavities 64 of the first and second plates 18 and 24, respectively. The vacuum and pressurized steam sources 30 and 32 are each, more particularly, connected to the support shaft 108 in a manner for communication with the first and second plates 18 and 24, respectively, via the support shaft 108 in a connected position of the vacuum and pressurized steam sources 30 and 32. The compressed air source 82 is also connected to the first and second hydraulic rams 80 and 100 for communication therebetween.

A flexible hose system 140 has a vacuum hose 142 connected between the vacuum source 30 and the support shaft 108 via a conventional coupling 144 to provide communication between the vacuum source 30 and the first and second plates 18 and 24, respectively. The flexible hose system 140 also includes a pressurized steam hose 146 connected between the pressurized steam source 30 and the support shaft 108 via a conventional coupling 148 to provide communication between the pressurized steam source 30 and the first and second plates 18 and 24, respectively. Furthermore, the flexible hose system 140 includes a compressed air hose 150 connected between the compressed air source 82 and the first and second hydraulic rams 80 and 100 via a first conventional coupling 152 and a second conventional coupling (not shown) to provide communication between the compressed air source 82 and the first and second hydraulic rams 80 and 100, respectively. An electrical wiring bundle 154 is also included in the flexible hose system 140 for purposes which will be made more apparent below.

A valve 156 is interposed in the vacuum hose 142 between the vacuum source 30 and the support shaft 108. The valve 156 is activatingly positionable in one position establishing communication between the vacuum source 30 and the support shaft 108 and deactivatingly positionable in one other position interrupting the communication between the vacuum source 30 and the support shaft 108.

Another valve 158 is interposed in the pressurized steam hose 146 between the pressurized steam source 32 and the support shaft 108. The valve 158 is activatingly positionable in one position establishing communication between the pressurized steam source 32 and the support shaft 108 and deactivatingly positionable in one other position interrupting the communication between the pressurized steam source 32 and the support shaft 108. It should be noted that, when the vacuum source 30 is in communication with the support shaft 108, the communication between the pressurized steam source 32 and the support shaft 108 is interrupted and vice-versa.

A third valve 160 is interposed in the compressed air hose 150 between the compressed air source 82 and the hydraulic rams 80 and 100. The valve 160 is activatingly positionable in one position establishing communication between the compressed air source 82 and the hydraulic rams 80 and 100 and deactivatingly positionable in one other position interrupting the communication between the compressed air source 82 and the hydraulic rams 80 and 100. It should also be noted that when the compressed air source 82 is in communication with the hydraulic rams 80 and 100, the vacuum source 30 is in communication with the support shaft 108.

The valves 156, 158 and 160 in one embodiment are solenoid actuated type valves, the solenoid portion of the valves 156, 158 and 160 being activated by an electrical power source 162 (see FIG. 4) via an electrical signal transmitted by electrical conductors included in the electrical wiring bundle wherein a switch is interposed to be activated by an operator as desired to establish continuity between the electical power source 140 and the valves 156, 157 and 158. As shown in FIGS. 1 and 3, a plurality of switches are disposed within a portion of the hand grip 132 of the handle assembly 12 for the purpose of activating the values 156, 158 and 160 and the hoist 34. A vacuum switch 164 is interposed in a signal path 166 between the valves 156 and 160 and the power source 162. Similarly, a steam switch 168 is interposed in the signal path 166 between the power source 162 and the valve 158; and a first hoist switch 170 is interposed in the signal path 166 between the power source 162 and the hoist 34 for activating the hoist 34 in the cable retrieving position. A second hoist switch 172 is interposed in the signal path 166 between the power source 162 and the hoist 34 for activating the hoist 34 in the cable releasing position.

Actuating the vacuum switch 164 establishes continuity between the valves 156 and 160 and the power source 162 via the signal path 166 activating the valves 156 and 160. The valve 156, in the activated position, establishes communication between the vacuum source 30 and the cavities 64 and 72 in the first and second plates 18 and 24, respectively; and the valve 160, in the activated position, establishes communication between the compressed air source 82 and the first and second hydraulic rams 80 and 100, respectively. Actuating the pressurized steam switch 168 establishes continuity between the valve 158 and the power source 162 via the signal path 166 thereby activating the valve 158. The valve 158, in the activated position, establishes communication between the pressurized steam source 32 and the cavities 64 and 72 in the first and second plates 18 and 24, respectively.

OPERATION OF THE PREFERRED EMBODIMENT

In operation, the food processing apparatus 10 is utilized in a system wherein the hog carcasses 44 are delivered to a leaf fat removal station via an overhead moving conveyor. The operator at the leaf fat removal station positions the first and second plates 18 and 24 via the hoist 34 to a desired position relative to the next approaching hog carcass 44. More particularly, the first and second plates 18 and 24 are positioned vertically with respect to the leaf fat 52 and 56 of the hog carcass 44 in a generally vertical position with the first hook 76 near the lower end of the leaf fat 52 and the second hook 96 near the lower end of the leaf fat 56.

The operator grippingly engages the hand grips 132 and 134 of the handle assembly 12 maneuverably positioning the first plate 18 in the removal position with respect to the leaf fat 52 and positions the second plate 24 in the removal position with respect to the leaf fat 56 via maneuvering the handle assembly 12. As the first plate 18 is positioned in the removal position with the first face 20 of the first plate 18 engaging a portion of the exposed leaf fat surface 54 of the leaf fat 52, the operator actuates the vacuum switch 164 thereby activating the valves 156 and 160. The activation of the valves 156 and 160 establishes communication between the vacuum source 30 and the cavities 64 and 72 of the first and second plates 18 and 24, respectively, via the vacuum hose 142 and the support shaft 108, and also establishes communication between the compressed air source 82 and the first and second hydraulic rams 80 and 100 via the compressed air hose 150. The suction created within the cavity 64 of the first plate 18 forms a suction at the intersection of the openings 66 and the first face 20 of the first plate 18 pulling a portion of the leaf fat 52 into engagement with the first face 20 of the first plate 18 for maintaining an engagement between the first plate 18 and the leaf fat surface 54 during the removal of the leaf fat 52 from the hog carcass 44. The compressed air source 82, now in communication with the first hydraulic ram 80, causes the first ram portion 84 to travel in the first ram direction 86 forcing the first hook 76 in the first pivotal direction 88. The first hook 76 severingly engages a portion of the leaf fat 52 near the lower end to sever a portion of the leaf fat 52 from the hog caracass 44. The initial severing of a portion of the leaf fat 52 near the lower end from the hog carcass 44 facilitates the removal of the leaf fat 52 from the hog carcass 44.

The first face 26 of the second plate 24 is simultaneously engaged with a portion of the leaf fat surface 58 of the leaf fat 56 via a similar operation engaging the first face 20 of the first plate 18 with the leaf fat surface 54 of the leaf fat 52. The second hook 96 severingly engages a portion of the leaf fat 56 near the lower end to sever the portion of the leaf fat 56 from the hog carcass 44 simultaneously with, and via a similar operation to, the first hook 76.

While maintaining the engagement between the first face 20 of the first plate 18 and the leaf fat 52 and between the first face 26 of the second plate 24 and the leaf fat 56 via the suction formed by the vacuum source 30, the operator actuates the second hoist switch 172 activating the hoist 34 in the cable retrieving position. The hoist 34 in the cable retrieving position, retrieves a portion of the hoist cable 38, thereby moving the first and second plates 18 and 24 in the second direction 42 relative to the hog carcass 44. The second direction 42 is generally directed from the lower ends of the leaf fat 52 and 56 toward the upper ends, respectively. The movement of the first and second plates 18 and 24 in the second direction 42 relative to the hog carcass 44 pulls the severed portion of the leaf fat 52 near the lower end away from the hog carcass 44 and pulls the severed portion of the leaf fat 56 near the lower end away from the hog carcass 44. Continued movement of the first and second plates 18 and 24 in the second direction 42 via the hoist 34 strips the leaf fat 52 and 56 away from the hog carcass 44 and thereby removes the leaf fat 52 and 56 from the hog carcass 44. During the movement of the first and second plates 18 and 24 removing the leaf fat 52 and 56, the operator maintains the hand grips 132 and 134 in his grasp to control the relative disposition of the first faces 20 and 26 of the first and second plates 18 and 24 for maintaining a generally parallel relationship with respect to the hog carcass 44 to provide a relatively smooth leaf fat removal process.

After the leaf fat 52 and 56 has been removed from the hog carcass 44, the vacuum switch 164 is released deactivating the valves 156 and 160, thereby interrupting the communication between the vacuum source 30 and the cavities 64 and 72 in the first and second plates 18 and 24, respectively, terminating the suction within the cavities 64 and 72; and also interrupting communication between the compressed air source 82 and the first and second hydraulic rams 80 and 100 causing the first ram portion 84 and the second ram portion (not shown) to travel in the second ram direction 92 (via return springs not shown) moving the first and second hooks 76 and 96 in a second pivotal direction 94. The first and second plates 18 and 24 and the first and second hooks 76 and 96 are, correspondingly, released from engagement with the leaf fat 52 and 56.

To substantially prevent the possible eventual blockage of the openings 66 and 74 in the first faces 20 and 26 of the first and second plates 18 and 24, the operator cleans portions of the leaf fat 52 from the openings 66 of the first plate 18 and portions of the leaf fat 56 from the openings 74 of the second plate 24 via the use of the pressurized steam source 32. If cleaning of the openings 66 and 74 is desired, the operator actuates the steam switch 168, thereby activating the valve 158 and establishing communication between the pressurized steam source 32 and the support shaft 108 via the pressurized steam hose 140. The pressurized steam source 32 provides a flow of steam through the support shaft 108 and through the cavities 64 and 72 of the first and second plates 18 and 24. The flow of steam through the cavity 64 produces a flow of steam through the openings 66 of the first plate 18 and, with the cooperation of the heat of the steam, blows portions of the leaf fat 52 from the openings 66, and the flow of steam through the cavity 72 produces a flow of steam through the openings 74 of the second plate 24 and, with the cooperation of the heat of the steam, blows portions of the leaf fat 56 from the opening 74. After the openings 66 and 74 in the first and second plates 18 and 24 have been sufficiently cleaned the steam switch 168 is opened, thereby deactivating the valve 158 and interrupting the communication between the pressurized steam source 32 and the cavities 64 and 72 in the first and second plates 18 and 24.

The first and second plates 18 and 24, after the leaf fat removal process has been performed, are repositioned vertically with respect to the next hog carcass 44 being moved to the leaf fat removal station via the overhead conveyor wherein the first hoist switch 170 is actuated for activating the hoist 34 in the cable releasing position releasing a portion of the hoist cable 38 thereby moving the first and second plates 18 and 24 in the first direction 40, generally opposite the second direction 42, to desired vertical position with respect to the next hog carcass 44.

Changes may be made in the construction and the operation of the various parts, elements and assemblies described herein without departing from the spirit and the scope of the invention as defined in the following claims:

What is claimed is:

1. An apparatus for removing leaf fat from the abdominal cavity of a hog carcass, comprising:
   a first plate having a first face and a second face, the first face being engageable with a portion of the exposed surface of the leaf fat in a removal position of the first plate with respect to the leaf to be removed;
   means connected to the first plate for positioning the first plate in the removal position with the first face engaging a portion of the leaf fat to be removed;
   means connected to the first plate for severingly engaging a portion of the leaf fat in the removal position of the first plate, a portion of the leaf fat being severed from the hog carcass by said means in the removal position of the first plate for facilitating the removal of the leaf fat from the hog carcass; and
   means connected to the first plate for maintaining an engagement between the first face of the first plate and a portion of the leaf fat in the removal position of the first plate while moving the first plate relative to the hog carcass for removing a portion of the leaf fat from the hog carcass.

2. The apparatus of claim 1 wherein the first plate includes a cavity formed in a portion thereof and at least one opening formed through the first face of the first plate intersecting the cavity; and wherein the means for maintaining an engagement between the first plate and the leaf fat is defined further to include:
   a vacuum source; and
   means for connecting the vacuum source to the cavity of the first plate for establishing communication between the vacuum source and the cavity of the first plate in one position of said means and interrupting the communication between the vacuum source and the cavity of the first plate in one other position of said means, the vacuum source creating a suction within the cavity of the first plate via said means and the suction within the cavity forming a suction at the intersection of the openings and the first face of the first plate pulling a portion of the leaf fat into engagement with the first face of the first plate in the removal position of the first plate for maintaining the engagement between the first face of the first plate and a portion of the leaf fat while moving the first plate relative to the hog carcass for removing the leaf fat, and said means interrupting communication between the vacuum source and the cavity of the first plate terminating the suction within the cavity of the first plate for releasing the leaf fat from engagement with the first face of the first plate.

3. The apparatus of claim 1 wherein the means for severingly engaging a portion of the leaf fat is defined further to include:
a first hook connected to the first plate and having a portion forming a knife edge, the knife edge severingly engaging a portion of the leaf fat to be removed during the positioning of the first plate in the removal position.

4. The apparatus of claim 3 wherein the first hook is further characterized as being pivotally connected to the first plate, and wherein the means for severingly engaging a portion of the leaf fat is defined further to include:
means connected between the first plate and the first hook for pivoting the first hook in a first pivotal direction to severingly engage the knife edge portion of the first hook with the leaf fat to be removed during the positioning of the first plate in the removal position, and for pivoting the first hook in a second pivotal direction substantially opposite to the first pivotal direction to disengage the knife edge portion of the first hook from the leaf fat after the removal of the leaf fat from the hog carcass.

5. The apparatus of claim 1 wherein the means for positioning the first plate in the removal position is defined further as being maneuverably positionable via an operator and defined further to include:
a handle assembly having a first end and a second end, a portion of the first end of the handle assembly being connected to the first plate and extending substantially perpendicularly therefrom, a portion of the handle assembly being grippingly engageable via an operator and the first plate being positionable into and from the removal position via maneuvering the handle assembly.

6. The apparatus of claim 5 wherein the means for positioning the first plate in the removal position is defined further to include:
a hoist, having a cable releasing position and a cable retrieving position;
means connected to the hoist for supporting the hoist generally above the hog carcass; and
a cable having one end connected to the hoist and the opposite end connected to one of the first plates and the handle assembly, the cable being released in a cable releasing direction in the cable releasing position of the hoist for moving the first plate in a first direction relative to the hog carcass and the cable being retrieved in a cable retrieving direction in the cable retrieving position of the hoist for moving the first plate in a second direction with respect to the hog carcass.

7. The apparatus of claim 5 wherein the apparatus is defined further to include:
a second plate having a first face and a second face, the second plate being connected to a portion of the first end of the handle assembly and the first face of the second plate being engageable with a portion of the exposed surface of the leaf fat in a removal position of the second plate with respect to the leaf fat to be removed via the maneuvering of the handle assembly.

8. The apparatus of claim 7 wherein the means for severingly engaging a portion of the leaf fat is defined further to include:
a second hook connected to the second plate having a portion forming a knife edge, the knife edge severingly engaging a portion of the leaf fat to be removed during the positioning of the first plate in the removal position.

9. The apparatus of claim 8 wherein the second hook is further characterized as being pivotally connected to the second plate, and wherein a means for severingly engaging a portion of the leaf fat is defined further to include:
means connected between the second plate and the second hook for pivoting the second hook in a first pivotal direction to severingly engage the knife edge portion of the second hook with the leaf fat to be removed during the positioning of the second plate in the removal position, and for pivoting the second hook in a second pivotal direction substantially opposite to the first pivotal direction to disengage the knife edge portion of the second hook from the leaf fat after the removal of the leaf fat from the hog carcass.

10. The apparatus of claim 7 wherein the handle assembly is defined further to include:
a hollow support shaft having opposite ends, one end of the hollow support shaft being connected to the first plate and the opposite end being connected to the second plate;
a control shaft having opposite ends, one end of the control shaft being connected to a portion of the hollow support shaft and extending substantially perpendicularly therefrom;
a curved hand grip formed on the end of the control shaft opposite the end of the control shaft connected to the hollow support shaft, the hand grip being grippingly engageable via an operator for manueveringly positioning the first and second plates in the removal position with respect to the leaf fat to be removed; and
a hand grip formed on the medial section of the control shaft.

11. The apparatus of claim 10 wherein the hog carcass includes first and second sides, a portion of the leaf fat being formed on the first side and another portion of the leaf fat being formed on the second side; and wherein the hollow support shaft is further characterized as spacing the first plate from the second plate for positioning the first plate in the removal position with respect to the leaf fat formed on one of the first and second sides of the hog carcass when the second plate is positioned in the removal position with respect to the leaf fat formed on the other of the first and second sides of the hog carcass.

12. The apparatus of claim 2 wherein the apparatus is defined further to include:
   a pressurized steam source; and
   means for connecting the pressurized steam source to the cavity of the first plate for establishing communication between the pressurized steam source and the cavity of the first plate in one position of said means and interrupting the communication between the pressurized steam source and the cavity of the first plate in one other position of said means, the pressurized steam source producing a flow of steam through the cavity of the first plate and the openings formed through the first face of the first plate via said means and establishing communication therebetween in the one position, the flow of steam through the openings removing portions of the leaf fat from the openings after the removal of the leaf fat from the hog carcass.

13. The apparatus of claim 7 wherein the first plate includes a cavity formed in a portion thereof and at least one opening formed through the first face of the first plate intersecting the cavity, and the second plate includes a cavity formed in a portion thereof and at least one opening formed through the first face of the second plate intersecting the cavity; and wherein the means for maintaining an engagement between the first plate and the leaf fat is defined further as maintaining an engagement between the first face of the second plate and a portion of the leaf fat to be removed in the removal position of the second plate, said means being defined further to include:
   a vacuum source; and
   means for connecting the vacuum source to the cavity of the first plate and to the cavity of the second plate for establishing communication between the vacuum source and the cavities of the first and second plates in one position of said means and interrupting the communication between the vacuum source and the cavities of the first and second plates in one other position of said means, the vacuum source creating a suction within the cavity of the first plate and within the cavity of the second plate via said means and the suction within the cavities of the first and second plates forming a suction at the intersection of the openings in the first faces of the first and second plates pulling a portion of the leaf fat into engagement with the first faces of the first and second plates in the removal position of the first and second plates for maintaining the engagement between the first faces of the first and second plates and a portion of the leaf fat while moving the first and second plates relative to the hog carcass for removing the leaf fat, and said means interrupting communication between the vacuum source and the cavities of the first and second plates in the one other position terminating the suction within the cavities of the first and second plates for releasing the leaf fat from engagement with the first faces of the first and second plates.

14. The apparatus of claim 13 wherein the apparatus is defined further to include:
   a pressurized steam source; and
   means for connecting the pressurized steam source to the cavity of the first plate and to the cavity of the second plate for establishing communication between the pressurized steam source and the cavities of the first and second plates in one position of said means and interrupting the communication between the pressurized steam source and the cavities of the first and second plates in one other position of said means, the pressurized steam source producing a flow of steam through the cavities of the first and second plates and the openings formed through the first faces of the first and second plates via said means and establishing communication therebetween in the one position, the flow of steam through the openings of the first and second plates removing portions of the leaf fat from the openings after the removal of the leaf fat from the hog carcass.

15. The apparatus of claim 14 wherein the means for positioning the first plate in the removal position is defined further to include:
   a hoist, having a cable releasing position and a cable retrieving position;
   means connected to the hoist for supporting the hoist generally above the hog carcass; and
   a cable having one end connected to the hoist and the opposite end connected to one of the first and second plates and the handle assembly, the cable being released in a cable releasing direction in the cable releasing position of the hoist for moving the first plate in a first direction relative to the hog carcass and the cable being retrieved in a cable retrieving direction in the cable retrieving position of the hoist for moving the first plate in a second direction with respect to the hog carcass.

16. The apparatus of claim 13 wherein the handle assembly is defined further to include:
   switch means connected to the handle assembly, one portion of the switch means having an actuated position for activating the means for connecting the vacuum source to the cavities of the first and second plates in the one position establishing communication between the vacuum source and the first and second plates and for activating the means for connecting the compressed air source to the means for pivoting the first and second hooks, another portion of the switch means having an actuated position for activating the means for connecting the pressurized steam source to the cavities of the first and second plates in the one position establishing communication between the pressurized steam source and the cavities of the first and second plates, one other portion of the switch means having an actuated position for activating the hoist in the cable releasing position, and still another portion of the switch means having an actuated position for activating the hoist assembly in the cable retrieving position.

* * * * *